US010295375B2

(12) United States Patent
May

(10) Patent No.: US 10,295,375 B2
(45) Date of Patent: May 21, 2019

(54) AIR SPRING HEIGHT MEASUREMENT ARRANGEMENT

(71) Applicant: Stemco Products, Inc., Charlotte, NC (US)

(72) Inventor: Lutz May, Berg (DE)

(73) Assignee: Stemco Products, Inc., Charlotte, NC (US)

( * ) Notice: Subject to any disclaimer, the term of this patent is extended or adjusted under 35 U.S.C. 154(b) by 0 days.

(21) Appl. No.: 15/594,034

(22) Filed: May 12, 2017

(65) Prior Publication Data

US 2017/0248403 A1 Aug. 31, 2017

Related U.S. Application Data

(63) Continuation of application No. 14/857,478, filed on Sep. 17, 2015, now Pat. No. 9,683,870, which is a continuation of application No. 14/066,815, filed on Oct. 30, 2013, now Pat. No. 9,163,924.

(30) Foreign Application Priority Data

Nov. 2, 2012 (EP) ..................................... 12191149

(51) Int. Cl.
*F16F 9/32* (2006.01)
*F16F 9/04* (2006.01)
(Continued)

(52) U.S. Cl.
CPC ............ *G01D 5/2073* (2013.01); *B60G 11/27* (2013.01); *F16F 9/04* (2013.01); *F16F 9/3292* (2013.01);
(Continued)

(58) Field of Classification Search
CPC .... F16F 9/04; F16F 9/05; F16F 9/3292; F16F 2230/08; F16F 2230/0047; G01B 7/02;
(Continued)

(56) References Cited

U.S. PATENT DOCUMENTS 5,521,497 A * 5/1996 Schneider ................ G01B 7/14
267/64.19
5,747,996 A * 5/1998 Fuchs .................... G01B 7/004
324/207.17
(Continued)

FOREIGN PATENT DOCUMENTS

EP 2366972 A2 * 9/2011 ................ F16F 9/04
GB 2475841 B * 5/2012 ............... G01B 7/31

*Primary Examiner* — Thomas J Williams
(74) *Attorney, Agent, or Firm* — Perkins Coie LLP

(57) ABSTRACT

The subject invention relates to an air spring height measurement arrangement comprising a magnetic field transmitting arrangement (110) and a magnetic field receiving arrangement (120). The magnetic field transmitting arrangement is adapted to adopt a first state and a second state with regard to the magnetic field receiving arrangement. One of the magnetic field transmitting arrangement (110) and the magnetic field receiving arrangement (120) comprises a first coil (141) and a second coil and the other comprises a third coil (143). A first central axis (161) of the first coil and a second central axis (162) of the second coil enclose a first angle (171) and, in the first state, a third central axis (163) of the third coil (143) and the first central axis enclose a second angle (172), which first and second angle cannot be 0°.

20 Claims, 11 Drawing Sheets

(51) Int. Cl.
  *G01B 7/14* (2006.01)
  *G01D 5/20* (2006.01)
  *G01B 7/00* (2006.01)
  *B60G 11/27* (2006.01)
  *G01B 7/02* (2006.01)

(52) U.S. Cl.
  CPC ............... *G01B 7/003* (2013.01); *G01B 7/02* (2013.01); *G01B 7/14* (2013.01); *G01D 5/2066* (2013.01); *B60G 2400/252* (2013.01); *B60G 2401/17* (2013.01)

(58) Field of Classification Search
  CPC .......... G01B 7/04; G01B 7/003; G01B 7/023; G01B 7/102; G01B 7/14; G01D 5/204; G01D 5/2066; G01D 5/2073
  See application file for complete search history.

(56) References Cited

U.S. PATENT DOCUMENTS

| | | | |
|---|---|---|---|
| 6,211,666 B1* | 4/2001 | Acker | A61B 5/06 128/899 |
| 7,364,144 B2* | 4/2008 | Nordmeyer | B60G 17/01933 267/64.27 |
| 7,490,817 B2* | 2/2009 | Nordmeyer | B60G 11/27 267/64.27 |
| 7,532,110 B2* | 5/2009 | Nordmeyer | B60G 17/01933 340/438 |
| 7,733,239 B2* | 6/2010 | Nordmeyer | G01S 13/758 267/64.27 |
| 7,959,136 B2* | 6/2011 | Nordmeyer | B60G 17/01933 267/64.27 |
| 7,959,137 B2* | 6/2011 | Nordmeyer | B60G 11/27 267/64.27 |
| 8,378,692 B2* | 2/2013 | Moenkemoeller | G01D 5/2073 324/612 |
| 8,915,508 B2* | 12/2014 | May | F16F 9/3292 267/64.19 |
| 9,163,924 B2* | 10/2015 | May | F16F 9/04 |
| 9,683,870 B2* | 6/2017 | May | G01D 5/2073 |
| 2009/0140729 A1* | 6/2009 | Roziere | G01D 5/2086 324/207.17 |
| 2012/0056616 A1* | 3/2012 | May | F16F 9/04 324/207.15 |
| 2014/0306695 A1* | 10/2014 | May | G01B 7/023 324/207.22 |

* cited by examiner

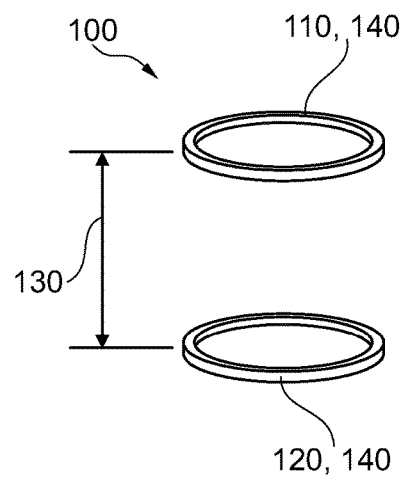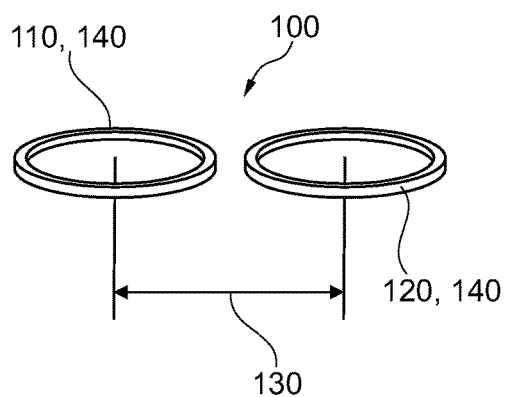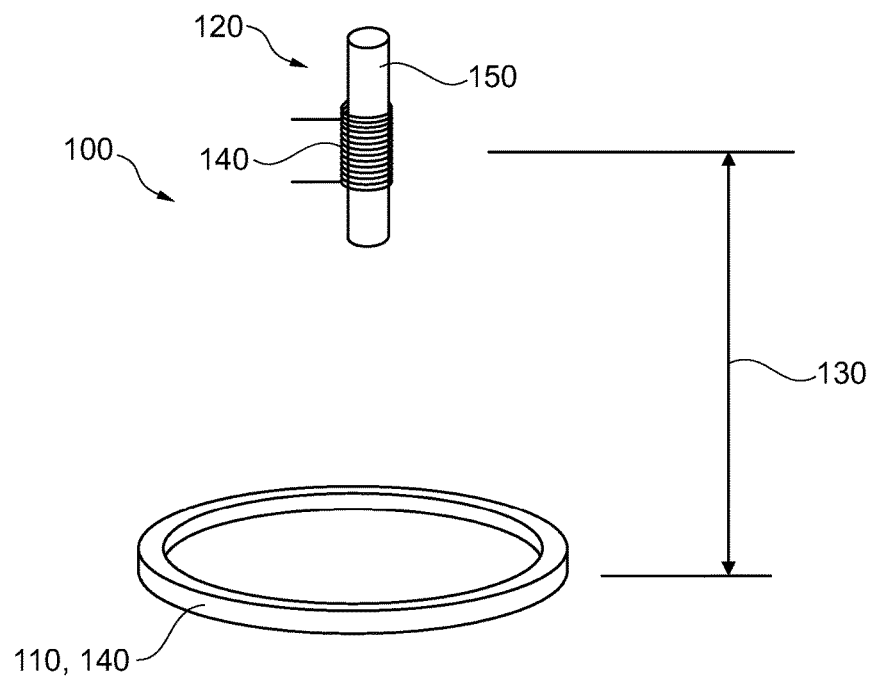
Fig. 1A  Fig. 1B
Fig. 1C

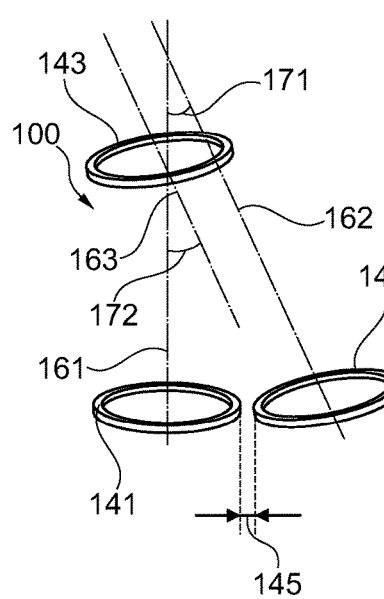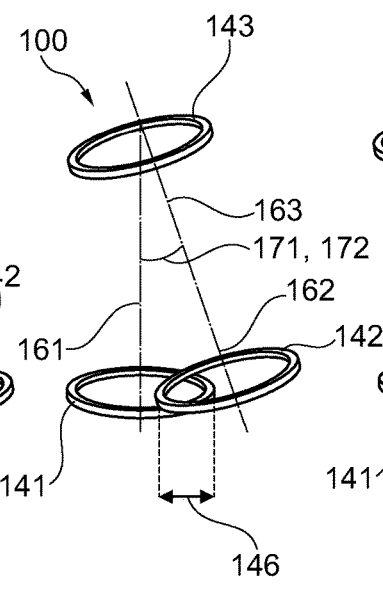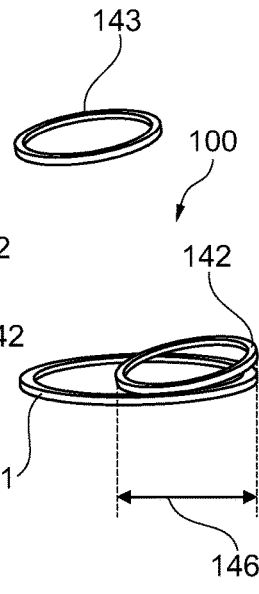
Fig. 3  Fig. 4  Fig. 5
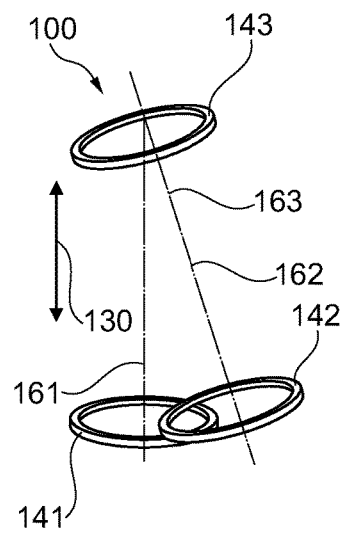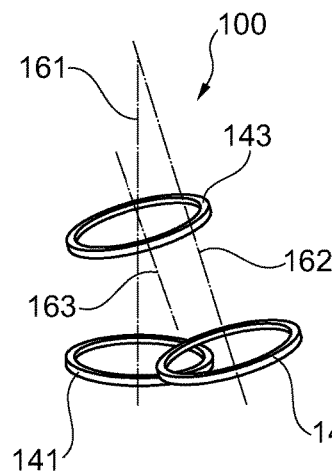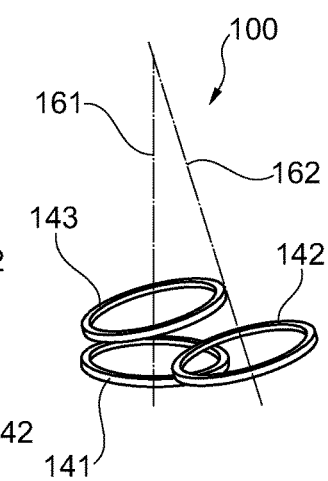
Fig. 6  Fig. 7  Fig. 8

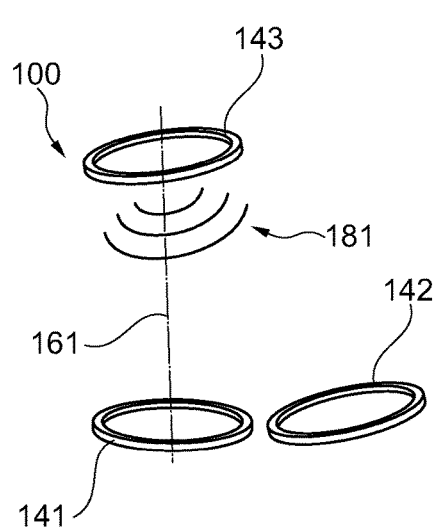
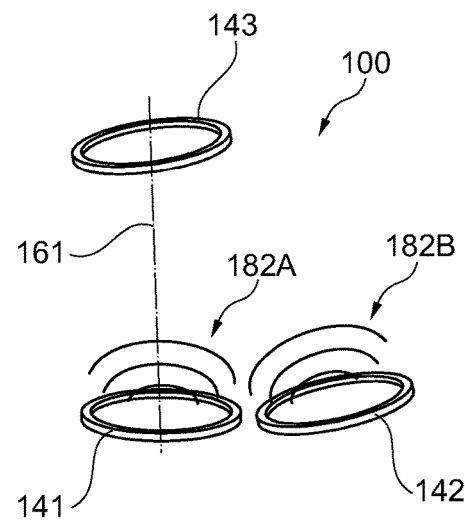
Fig. 9              Fig. 10
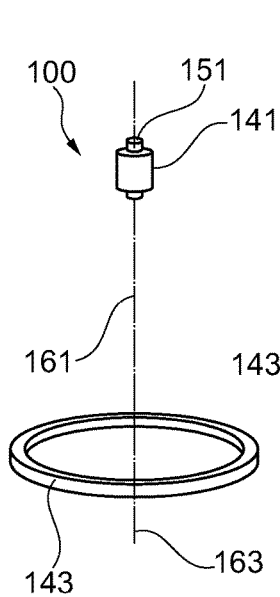
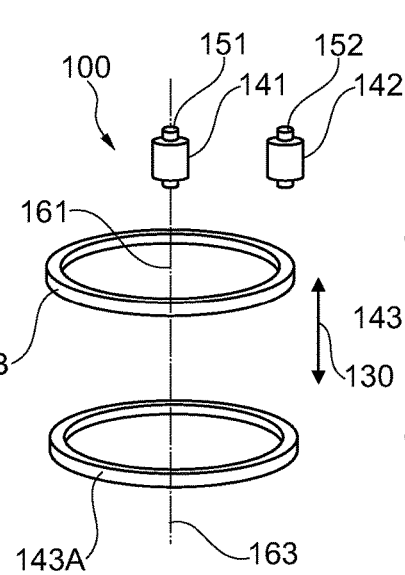
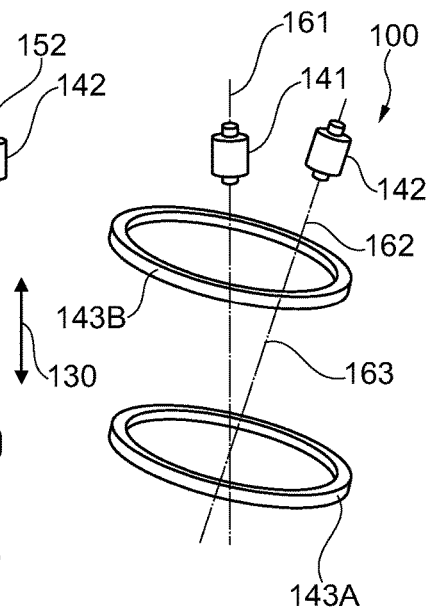
Fig. 11A    Fig. 11B    Fig. 12

AIR SPRING HEIGHT MEASUREMENT ARRANGEMENT

This application claims benefit of European Patent Application Serial No. EP 12191149.9, filed on Nov. 2, 2012. The teachings of European Patent Application EP 12191149.9 are incorporated herein by reference in their entirety.

FIELD OF THE INVENTION

The invention relates to an air spring height or distance measurement arrangement and an air spring for a vehicle having an air spring height or distance measurement arrangement.

BACKGROUND OF THE INVENTION

Height or distance measurement has a wide variety of possible applications. However, the environment where the height measurement is being made can present a wide variety of challenges. This is particularly the case in situations where height or distance measurements are being made in automotive applications. For example, in measuring the height of a vehicle frame above the surface of a road, challenges are typically presented by road noise, dirt, dust, and vibrations which are normally present in the environment surrounding the vehicle where the measurement is being taken.

DE 10 2006 017 275 A1 and EP 1845278 A1 describe an air spring having an integrated positioning device, wherein the distance between two parts of the air spring can be measured by an analogue proximity sensor. Commonly used proximity sensors are, for example, based on an ultrasonic measurement principle which is very sensitive in noisy and vibrating environments, as the acoustic noise and the ultrasonic measurement principle are based on the same physical principle, i.e. sound propagation. These pneumatic air springs have an integrated height measuring device, a pressure chamber or an inner chamber. The exterior of the inner chamber is aligned in the analog proximity sensor and a metal plate is arranged opposite to the interior of the proximity sensor. The proximity sensor and the metal plate are formed pre-adjustable to each other.

Further, DE 10 2008 064 647 A1 describes an air spring for a vehicle having a measuring device, which measuring device may transmit data and energy via predetermined and fixed distance contactless. This pneumatic cushioning equipment has a base unit which has a pressure source and a valve unit which has an air supply made of non-metallic material, particularly plastic. A switching valve of the base unit is provided between the pressure source and appropriate valve unit of the arranged air supply.

EP 2 366 972 and United States Patent Publication No. 2012/0056616 A1 describe a sensor device for height measurement in an air spring and a corresponding method allowing determining changes in a working stroke of the air spring. These publications more specifically disclose a sensor device for a height measurement, comprising: a transceiving coil arrangement including at least one transceiving coil; a transmitting drive unit; a receiver unit; a reference coil arrangement; and a reference control unit, wherein the transceiving coil arrangement is coupled to both the transmitting drive circuit and the receiver unit, wherein the reference control unit is coupled to the reference coil arrangement, wherein the reference coil arrangement is movably positioned with respect to the transceiving coil arrangement, wherein the drive unit is adapted to drive the transceiving coil arrangement with an AC power signal of a predetermined duration for generating a magnetic field, wherein the reference control unit is adapted for accumulating energy out of the generated magnetic field and for generating a reference signal based on an amount of the accumulated energy, and wherein the receiver unit is adapted for receiving the reference signal and for outputting a signal for determining a distance between the transceiving coil arrangement and the reference coil arrangement based on at least one out of a group, the group consisting of the reference signal and the duration of the AC power signal.

SUMMARY OF THE INVENTION

It may be seen as an object of the present invention to provide an air spring height measurement arrangement and an air spring having an air spring height measurement arrangement for distance or height measurement being capable of providing more precise height measurement.

The object of the present invention is solved by the subject matter of the independent claims, wherein further embodiments are incorporated in the dependent claims and in the subsequent specification. It should be noted that the following described exemplary embodiments of the invention apply for the air spring height measurement arrangement as well as to the air spring.

According to an aspect of the invention, an air spring height measurement arrangement comprises a magnetic field transmitting arrangement and a magnetic field receiving arrangement. The magnetic field transmitting arrangement is adapted to adopt a first state and a second state with regard to the magnetic field receiving arrangement, wherein one of the magnetic field transmitting arrangement and the magnetic field receiving arrangement comprises a first coil and a second coil and wherein the other one of the magnetic field transmitting arrangement and the magnetic field receiving arrangement comprises a third coil. A first central axis of the first coil and a second central axis of the second coil enclose a first angle which is unequal to 0°, wherein, in the first state, a third central axis of the third coil and the first central axis enclose a second angle which is unequal to 0°. In other words the first angle and the second angle cannot be 0°.

The air spring height measurement arrangement as described above and hereinafter may enable a more precise measurement of a height or a distance between the magnetic field transmitting arrangement and the magnetic field receiving arrangement. In particular, the air spring height measurement arrangement may enable the measurement of a motion of one of the magnetic field transmitting arrangement and the magnetic field receiving arrangement in more than one dimension, for example a movement of the magnetic field transmitting arrangement towards to or away from the magnetic field receiving arrangement and a movement in a lateral direction with respect to the magnetic field receiving arrangement, respectively.

The magnetic field transmitting arrangement may be adapted to transmit a first magnetic field and the magnetic field receiving arrangement may be adapted to receive the first magnetic field. The distance between the magnetic field transmitting arrangement and the magnetic field receiving arrangement may thus be determined as a result of the measured intensity of the field lines of the first magnetic field by the magnetic field receiving arrangement.

The first state may correspond to an initial state of the air spring height measurement arrangement, wherein the second state may correspond to a compressed state of the air spring height measurement arrangement, in which compressed state the distance between the magnetic field transmitting arrangement and the magnetic field receiving arrangement is less than in the initial state.

The coils as described above and hereinafter may be coils comprising a wounded wire with or without a core (air coils or cored coils), wherein the core may comprise a ferrite or a ferromagnetic material.

Either the magnetic field transmitting arrangement may have one coil and the magnetic field receiving arrangement may have two coils or the magnetic field transmitting arrangement may have two coils and the magnetic field receiving arrangement may have one coil.

Each of the coils has a central axis which extends perpendicular or orthogonal with respect to a plane which is determined by the windings of the coil. In case of a round wounded coil, the central axis extends orthogonally to the circular shaped cross section of the round wounded coil.

The first central axis, i.e. the central axis of the first coil, and the second central axis, i.e. the central axis of the second coil, intersect under a first angle unequal to 0°. In other words, the cross section area of the first coil and the cross section area of the second coil are inclined with respect to each other. As a result, the first central axis and the second central axis, of which each is orthogonally with respect to the cross section area of the according coil, intersect under an angle corresponding to the inclination angle between the cross section area of the first coil and the cross section area of the second coil.

In the first state, the first central axis and the third central axis, i.e. the central axis of the third coil, intersect under a second angle unequal to 0°. Thus, the first coil and the second coil as well as the first coil and the third coil are arranged such that the respective cross section area and the respective central axis are inclined to each other, which means that the first central axis and the second central axis on one side as well as the first central axis and the third central axis on the other side each have an intersection point in which the enclose the first angle and the second angle, respectively.

Each of the first angle and the second angle may be between 0° and 90°, preferably between 0° and 45° and more preferably between 0° and 20°. For instance, the first angle and the second angle can be within the range of 0.1° to 45° or within the range of 0.5° to 45° or within the range of 1° to 45°. This may allow an air spring height measurement arrangement design with minimum space requirements.

The magnetic field transmitting arrangement and the magnetic field receiving arrangement are arranged with respect to each other in a manner the they move towards each other when the state of the air spring height measurement arrangement changes from the first state to the second state and that they move away from each other when the state of the air spring height measurement arrangement changes from the second state to the first state.

In another embodiment, each of the magnetic field transmitting arrangement and the magnetic field receiving arrangement may comprise two coils, wherein at least one of the coils of each of the magnetic field transmitting arrangement and the magnetic field receiving arrangement may be inclined with respect to an intended moving direction of one of the magnetic field transmitting arrangement and the magnetic field receiving arrangement towards the other one. The two coils of the magnetic field transmitting arrangement and the magnetic field receiving arrangement may be arranged opposite to each other, wherein in one embodiment the coils diagonally opposite to each other are inclined towards each other. In one embodiment, one coil of the magnetic field transmitting arrangement and the magnetic field receiving arrangement, respectively, are inclined towards each other and in another embodiment, a first coil of the magnetic field transmitting arrangement is inclined towards a second coil of the magnetic field receiving arrangement and a second coil of the magnetic field transmitting arrangement is inclined towards a first coil of the magnetic field receiving arrangement.

In one embodiment, the first coil and the second coil are arranged opposite to each other with respect to a moving direction of the magnetic field transmitting arrangement or the magnetic field receiving arrangement from the first state to the second state.

According to an embodiment of the invention, the magnetic field transmitting arrangement comprises a magnetic field receiving unit and the magnetic field receiving arrangement comprises a magnetic field transmitting unit, wherein the magnetic field transmitting arrangement is adapted to transmit a first magnetic field and wherein the magnetic field receiving arrangement is adapted to receive the first magnetic field. The transmitting unit is adapted to transmit a second magnetic field which is generated out of an energy corresponding to the received first magnetic field and the receiving unit is adapted to receive the second magnetic field.

In this embodiment, the distance between the magnetic field transmitting arrangement and the magnetic field receiving arrangement is determined by measuring the field strength received by the magnetic field receiving unit which is arranged at the magnetic field transmitting arrangement. In other words, the first magnetic field is generated and transmitted by the magnetic field transmitting arrangement, subsequently detected and its energy stored by the magnetic field receiving arrangement, wherein the magnetic field transmitting unit of the magnetic field receiving arrangement generates the second magnetic field which is then detected by the magnetic field receiving unit of the magnetic field transmitting arrangement. Last, the detected magnetic field strength is a measurement criteria or a value for the distance between the magnetic field transmitting arrangement and the magnetic field receiving arrangement. Thus, the magnetic field receiving arrangement and the according magnetic field transmitting unit may not require an evaluation unit for determining the magnetic field strength.

According to a further embodiment of the invention, the first angle is equal to the second angle. In other words, both the second central axis and the third central axis are inclined by the same angle with respect to the first central axis. Thus, in one embodiment the second central axis and the third central axis may be parallel to each other and in another embodiment the second central axis and the third central axis may coincide, i.e. they may extend congruently.

According to a further embodiment of the invention, at least one of the first coil, the second coil, and the third coil comprises a core element. The core element may bundle or focus the magnetic field lines of the first magnetic field and/or the second magnetic field. Thus, the needed energy for generating the magnetic fields may be required and the air spring height measurement arrangement as described above and hereinafter may be operated with a minimum of energy.

According to a further embodiment of the invention, the third central axis and the second central axis run parallel to each other in the first state. Thus, the third coil and the second coil are arranged opposite to each other which may allow an improved measurement accuracy in the first state or in case the magnetic field transmitting arrangement is arranged distant to the magnetic field receiving arrangement.

According to a further embodiment of the invention, the third central axis and the second central axis coincide in the first state. Thus, the third central axis and the second central axis are parallel and congruent to each other and the third coil and the second coil are aligned to each other in a manner that in the first state the cross section areas of these coils are parallel to each other.

When being subjected to a movement from the first state to the second state, the third coil may be moved along the first central axis, i.e. towards to or away from the first coil. In this case, the inclination angle of the second central axis with respect to the third central axis does not change but they may not be congruent to each other.

By the individual inclination angle of the coils with respect to each other, an air spring height measurement arrangement as described above and hereinafter may thus enable a more precise distance measurement between the magnetic field transmitting arrangement and the magnetic field receiving arrangement and furthermore may facilitate a measurement of a lateral movement of one of the magnetic field transmitting arrangement and the magnetic field receiving arrangement with respect to the other one.

Furthermore, the air spring height measurement arrangement may facilitate the elimination of measurement errors as in a more distant state of the magnetic field transmitting arrangement and the magnetic field receiving arrangement, the third coil and the second coil, whose central axes coincide or are located close to each other, may provide a more exact measurement and in a closer state of the magnetic field transmitting arrangement and the magnetic field receiving arrangement, the third coil and the first coil, which are arranged opposite to each other in a moving direction from the first state to the second state, may provide a more exact measurement.

Thus, the air spring height measurement arrangement as described above and hereinafter may be tolerant, and in particular fault-tolerant, with respect to lateral movements of one of the magnetic field transmitting arrangement and the magnetic field receiving arrangement with respect to the other one due to vibrations or other force impacts as one of the magnetic field transmitting arrangement and the magnetic field receiving arrangement comprises two coils.

According to a further embodiment of the invention, the first coil comprises a lateral offset in a direction perpendicular to the first central axis with regard to the second coil. The first coil and the second coil are arranged such that they are displaced in order to have a gap or a spacing in between them. In other words, the first coil and the second coil neither adjoin nor overlap each other. The lateral offset is the distance between the first coil and the second coil.

According to a further embodiment of the invention, the first coil overlaps the second coil at least partially in a direction perpendicular to the first central axis. Thus, the air spring height measurement arrangement may allow a space saving arrangement of the first coil and the second coil.

According to a further embodiment of the invention, the first coil completely overlaps the second coil in a direction perpendicular to the first central axis. In particular, the cross section area of the first coil may be larger than the cross section area of the second coil. Thus, the second coil may especially be arranged within the windings of the first coil.

An overlap of the first coil and the second coil may be an overlap with regard to the third coil, i.e. one of the first coil and the second coil is behind the other one with respect to a moving direction of the third coil towards the first coil and the second coil.

According to a further embodiment of the invention, the third coil is adapted to move along the first central axis when being moved from the first state to the second state. The accuracy and precision of the distance measurement over a large movement distance or measurement range may be improved by moving the third coil towards to and away from the first coil along the first central axis while at the same time the third coil and the third central axis is inclined towards the second coil.

According to a further embodiment of the invention, each of the first coil and the second coil is a printed coil on a printed circuit board. This may further reduce the space needed for installing an air spring height measurement arrangement. The first coil and the second coil may be designed as conducting paths on a printed circuit board (PCB) or on a printed wiring board.

In one embodiment, the first coil and the second coil may be arranged each on an individual PCB. This allows an inclined arrangement of the first coil with respect to the second coil.

In an alternative embodiment, the first coil and the second coil may be arranged on a single PCB, wherein the PCB comprises a bending area which allows an inclined arrangement of one of the first coil and the second coil with respect to the other one.

According to a further embodiment of the invention, the third central axis and the first central axis run parallel to each other in the second state.

Thus, the third coil and the first coil are arranged opposite to each other in the second state, i.e. when the magnetic field transmitting arrangement and the magnetic field receiving arrangement are close to each other, such that a measurement accuracy may be increased when one of the magnetic field transmitting arrangement and the magnetic field receiving arrangement is close the second state.

According to a further embodiment of the invention, the third coil and the second coil are arranged opposite to each other in a direction of a second measuring direction in the first state.

The receiving coils or the magnetic field receiving arrangement may provide the highest sensitivity to changes of the distance between the magnetic field transmitting arrangement and the magnetic field receiving arrangement when the according coil is arranged such that a direction of the first magnetic field and/or the second magnetic field corresponds to the alignment of the receiving coil and is arranged such that the receiving coil is subjected to the highest field strength. The measuring direction is defined by the arrangement of the coils opposite to each other and by the direction of detecting changes in the received magnetic field strength when moving one of the coils away from and towards to the other one of the coils.

In case the coils are designed as air coils, this means that a cross section area of the third coil and of the second coil, respectively, are arranged parallel to each other and the respective central axes coincide. In case the coils are designed as cored coils, the second central axis and the third central axis are parallel to each other, and the coils do not have a longitudinal offset in a direction along any one of these axes, and when starting a movement of any one of the third coil and the second coil in the first state, the third coil and the second coil are being moved directly towards each other.

According to a further embodiment of the invention, the third coil and the first coil are arranged opposite to each other in a direction of a first measuring direction in the second state. Thus, the third coil changes its orientation in space when being moved from the first state to the second state. This may in particular occur while a swing movement of the third coil. The remarks with regard to the orientation of the third coil and the second coil in the first state apply in an analogous manner to the orientation of the third coil and the first coil in the second state.

According to a further embodiment of the invention, a movement of the magnetic field transmitting arrangement from the first state to the second state is adapted to occur within a measuring plane which is defined by the first measuring direction and the second measuring direction. The measuring plane is thus held by the vectors of the first measuring direction and the second measuring direction.

According to another aspect of the invention, an air spring for a vehicle is provided which comprises a first mounting element for being fixed to one of a vehicle's chassis and a movable part of a vehicle being movable with respect to the chassis, a second mounting element for being fixed to the other one of the vehicle's chassis and the movable part of the vehicle being movable with respect to the chassis, a bellow extending from the first mounting element to the second mounting element and including an air volume, and an air spring height measurement arrangement as described above and hereinafter. The magnetic field transmitting arrangement is arranged at the first mounting element and the magnetic field receiving arrangement is arranged at the second mounting element, wherein a movement of the first mounting element with respect to the second mounting element represents at least a part of a working stroke of the air spring.

The air spring with the air spring height measurement arrangement as described above and hereinafter may in particular be adapted to measure a road condition and a vehicle condition due to vibrations or cargo restrictions.

The invention relates to measuring the distance between two locations, like between the upper body of a vehicle and the wheel-suspension, or like between the chassis of a truck or trailer and the wheel axle. However, the air spring height measurement arrangement as described above and hereinafter can be used and applied to applications where the distance to be measured can be as little as 1 mm or as large as 1 meter.

The measurement principle is based on low field-strength, magnetic physics. The benefit of using low magnetic field strengths are low electric power consumptions, reduced magnetic emissions to eliminate the risk of interfering with other systems placed nearby, and eliminating the possibility that magnetic particles may be attracted to this measurement solution (cannot clot-up with ferromagnetic particles of any kind).

One of the targeted applications (the transportation market) may require that the air spring height measurement arrangement has to be very rugged (particular when placed near or at a suspension system). For instance, the air spring height measurement arrangement typically must be rugged enough to function reliably reliable under very harsh operating conditions including operating temperatures which are within a wide range from as low as about −50° C. to as high as about 125° C., exposure to oil vapor, humidity, dust and dirt, and mechanical shocks and vibrations. In other words, the arrangement (height measuring devise or system) should be relatively insensitive to changes in temperature, insensitive to mechanical shocks and vibrations, as well as being capable of operating reliably under conditions of exposure to high humidity, oil vapor, dirt, and/or dust.

However, it has to be recognized that the limiting factor in relation to the sensor system ruggedness may always be what the sensor electronics can cope with. Therefore, it may be important that the actual sensor module (the physical sensing element) can be placed separately in relation to the required sensor electronics, which is here the case. Meaning that the electronics could be placed at a location that is not exposed too very harsh operating conditions, while the actual sensing element is exposed to it.

To avoid unwanted interferences with commercially available radio receivers (car radios, mobile phones, television sets, remote controls, etc.), the operational frequency of the height or distance sensor arrangement as described above and hereinafter may be limited to maximum 100 kHz and may be 50 kHz in one preferred embodiment. The sensor system may perform better when choosing a higher frequency (like 300 kHz or even near 1 MHz) but then the required magnetic shielding may be difficult to achieve and because of the required additional EMI (Electro Magnetic Interference) control the overall system cost may grow significantly. This may be one of the main reasons of the specifications chosen for the inductors used (physical dimensions and inductivity).

The air coils may have a diameter between 8 and 20 cm, wherein the distance between the magnetic field transmitting arrangement and the magnetic field receiving arrangement in the first state may correspond to the twofold to fivefold air coil diameter.

The core of the cored coils may have a diameter of between 1 mm and 10 mm and a length of 2 mm to 6 mm, wherein the coils may have between 100 and 400 windings.

The diameter of the air coils may determine the practical usable measurement range of the height measurement arrangement. In connection with an air spring, the measurement range may also be called: the working stroke of the air spring or an according wheel suspension.

The main benefit of using air coils may be that the height and distance sensor system may be relatively insensitive to a range of tolerances and operational conditions. This includes that metallic objects (conductive metals and ferromagnetic metals) are placed near the side of the air spring height measurement arrangement.

The main benefit of using inductors (coils) with ferro-property related core material may be that they can be built much smaller to achieve a similar measurement performance in comparison to the much larger air coils. However, coils with ferro-core material may be by far more sensitive to ferro-metallic objects placed nearby and to mechanical assembly tolerances (like tilting, for example).

The present invention more specifically describes an air spring height measurement arrangement (100), comprising a magnetic field transmitting arrangement (110); and a magnetic field receiving arrangement (120); wherein the magnetic field transmitting arrangement is adapted to adopt a first state and a second state with regard to the magnetic field receiving arrangement; wherein one of the magnetic field transmitting arrangement (110) and the magnetic field receiving arrangement (120) comprises a first coil (141) and a second coil (142); wherein the other one of the magnetic field transmitting arrangement (110) and the magnetic field receiving arrangement (120) comprises a third coil (143); wherein a first central axis (161) of the first coil and a second central axis (162) of the second coil enclose a first angle (171) which is unequal to 0°; and wherein, in the first state, a third central axis (163) of the third coil (143) and the first central axis enclose a second angle (172) which is unequal to 0°.

The present invention further describes an air spring (300) for a vehicle, comprising a first mounting element (310) for being fixed to one of a vehicle's chassis (230) and a movable part (220) of a vehicle being movable with respect to the chassis; a second mounting element (320) for being fixed to the other one of the vehicle's chassis and the movable part (220) of the vehicle being movable with respect to the chassis; a bellow (330) extending from the first mounting element to the second mounting element and including an air volume; an air spring height measurement arrangement (100) according to any one of the preceding claims; wherein the magnetic field transmitting arrangement (110) is arranged at the first mounting element; wherein the magnetic field receiving arrangement (120) is arranged at the second mounting element; and wherein a movement of the first mounting element with respect to the second mounting element represents at least a part of a working stroke (130) of the air spring.

These and other aspects of the present invention will become apparent from and elucidated with reference to the embodiments described hereinafter.

BRIEF DESCRIPTION OF THE DRAWINGS

Exemplary embodiments of the present invention will be described in the following with reference to the following drawings.

FIG. 1A illustrates a distance measurement arrangement.
FIG. 1B illustrates a distance measurement arrangement.
FIG. 1C illustrates a distance measurement arrangement.
FIG. 1D illustrates a signal pattern of a distance measurement arrangement.
FIG. 3 illustrates an air spring height measurement arrangement according to an exemplary embodiment of the invention.
FIG. 4 illustrates an air spring height measurement arrangement according to an exemplary embodiment of the invention.
FIG. 5 illustrates an air spring height measurement arrangement according to an exemplary embodiment of the invention.
FIG. 6 illustrates an air spring height measurement arrangement according to an exemplary embodiment of the invention.
FIG. 7 illustrates an air spring height measurement arrangement according to an exemplary embodiment of the invention.
FIG. 8 illustrates an air spring height measurement arrangement according to an exemplary embodiment of the invention.
FIG. 9 illustrates an air spring height measurement arrangement according to an exemplary embodiment of the invention.
FIG. 10 illustrates an air spring height measurement arrangement according to an exemplary embodiment of the invention.
FIG. 11A illustrates a distance measurement arrangement.
FIG. 11B illustrates a distance measurement arrangement.
FIG. 12 illustrates an air spring height measurement arrangement according to an exemplary embodiment of the invention.

Figure 1E:
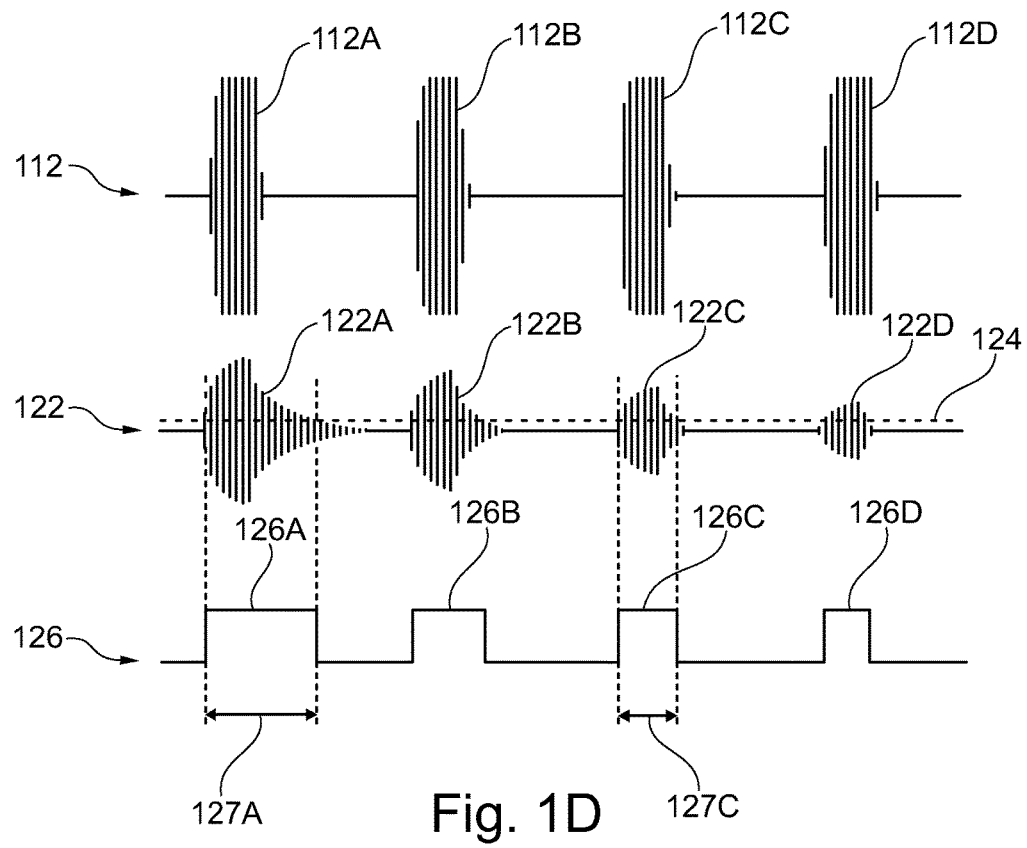
FIG. 1E illustrates a distance measurement arrangement.

The reference numerals used in the drawing are as follows:

100 air spring height measurement arrangement
105 power supply
110 magnetic field transmitting arrangement
111 transmitter circuit
112 transmitted signal
120 magnetic field receiving arrangement
121 receiver circuit
122 received signal
124 signal threshold value
126 encoded received signal
127 duration of encoded received signal
130 measuring distance
131 first measuring direction
132 second measuring direction
140 coil
141 first coil
142 second coil
143 third coil 145 lateral offset
146 overlap section
151 first core
152 second core
153 third core
161 first central axis
162 second central axis
163 third central axis
165 symmetry line
171 first angle
172 second angle
181 first magnetic field
182 second magnetic field
190 printed circuit board
195 bending line
210 mounting plate
220 movable part
221 hinge
225 moving direction
230 vehicle's chassis
300 air spring
310 first mounting element
320 second mounting element
330 bellow

DETAILED DESCRIPTION OF THE INVENTION

FIGS. 1A, 1B, and 1C illustrate a height measurement arrangement 100, each comprising a magnetic field transmitting arrangement 110 and a magnetic field receiving arrangement 120, wherein each of the magnetic field transmitting arrangement and the magnetic field receiving arrangement are illustrated in form of a coil 140. The coil may be an air coil as shown in FIGS. 1A, 1B, and 1C (magnetic field transmitting arrangement only), or a cored coil as shown in FIG. 1C in connection with the magnetic field receiving arrangement 120, which comprises a core 150.

The coils of the magnetic field receiving arrangement and of the magnetic field receiving arrangement may be arranged such that the cross sectional areas of the coils are parallel to each other and the measuring distance is in between the cross section areas, i.e. the coils are moving towards each other, as shown in FIGS. 1A and 1C, or such that the cross section areas of the coils are in the same plane, i.e. the coils are moving along a plane defined by the cross sectional areas of the coils when moving away from or towards each other and the measuring distance is arranged in the same plane.

When using air coils then they may have to be placed parallel to each other to provide improved measurement performances. FIG. 1A may represent the more reliable distance measurement system in comparison to FIG. 1B, which illustrates another potentially possible solution.

The larger the diameter of the air coil, the larger the measurement range may be. Depending on the sensitivity of the magnetic field receiving arrangement, the practical measurement range may vary between two to five times of the transmitter air coil diameter. For example when choosing a transmitter air coil diameter of 100 mm, then the practical measurement range (maximum distance between the transmitter and receiver coil) may be in the range of 200 mm and 500 mm. Accordingly, the practical measurement range will typically be about 2 times to about 5 times the diameter of the transmitter air coil.

FIG. 1C illustrates an air spring height measurement arrangement which may achieve good measurement results when using a large air coil as the magnetic field transmitting arrangement and a cored coil with ferro-material core that can be built much smaller than the air coil, as magnetic field receiving arrangement. This design may be tolerant to tilting tolerances, but may have the disadvantage that the receiving coil and in particular the core has to stand up-right, i.e. with its longitudinal axis parallel to the measuring direction 130. Thus, the larger the core item is, the shorter the usable working stroke of the air spring height measurement arrangement may be. From this point of view it may be best to have a very short core item in the magnetic field receiving arrangement, which on the other side may reduce the sensitivity range of the magnetic field receiving arrangement.

Coils with cores or inductors with a ferromagnetic material core may be used in order to reduce the physical dimension of the inductors (coils) used to build an air spring height measurement arrangement (or distance sensor). Such inductors or coils may be built with a much smaller diameter (in comparison to air coils), which may also have positive effects on the overall material cost when building an air spring height measurement arrangement.

FIG. 1D illustrates a transmitted signal 112 with four signal sequences 112A, 112B, 112C, and 112D transmitted by the magnetic field transmitting arrangement. Corresponding to the transmitted signals, the received signal 122 with the signal sequences 122A, 122B, 122C, and 122D are illustrated.

The distance between the magnetic field transmitting arrangement and the magnetic field receiving arrangement is determined as a result of the pulse length 127A, 127C of the encoded received signals 126A, 126B, 126C, and 126D. The pulse length is determined measured between the points in time where the received signal 122 is higher than a predetermined signal threshold value 124. In general, the closer the magnetic field transmitting arrangement and the magnetic field receiving arrangement are to each other, the longer is the pulse length 127, as the energy received from the detected magnetic field is higher in comparison to a larger distance between the magnetic field transmitting arrangement and the magnetic field receiving arrangement.

Instead of using a continuously transmitted signal, emitted by the magnetic field transmitting arrangement (no signal interruptions or signal pauses of any kind), the transmitted signal can be a simple burst of one or a few signal wave shapes of a constant frequency. The charging time and the discharging time of the receiving oscillator is then the basis for the determination of the distance of the magnetic field receiving arrangement to the magnetic field transmitting arrangement.

The closer the transmitter coil is placed to the receiver coil (or receiver coils) the longer the charge/discharge time of the received signal will be. The transmitter is emitting short signal bursts of a given frequency. FIG. 1D illustrates a change in the distance from the magnetic field receiving arrangement to the magnetic field transmitting arrangement from "short" distance (A), gradually with every following transmitter signal burst (B, C, D) to a large distance (D). As the distance between the transmitter coil and the receiver coil is increasing, the signal received at the receiver coil will become smaller.

Using a programmable signal amplitude threshold detection level 124 allows the following electronics circuitry to determine the time for the received signal to discharge. In the example shown in FIG. 1D, the signal discharging-time will begin to count from the moment the received signal crosses the programmable threshold line. Other solutions are possible as well. The signal discharging time will be longer (A) when the spacing between the transmitter coil and the receiver coil is very short. As the spacing is increasing (C) the discharging time will become shorter. The pulse length will be an indication of the spacing between the two coils.

The reason for using a "programmable" receiver threshold level 124 (or voltage) may be to increase the sensitivity of the receiver system and to deal more easily when the signal noise may increase. Of course, the above shown solution will also work when using a "fixed" level threshold.

The key benefit of this signal decoding concept may be that with little effort and little current, larger distances can be measured. Such a solution may have the potential of emitting signals that will interfere with other electronic systems that are placed nearby (potentially high EMI emissions).

FIG. 1E illustrates an air spring height measurement arrangement 100 with a magnetic field transmitting arrangement 110 and a magnetic field receiving arrangement 120, wherein the magnetic field transmitting arrangement comprises a third coil 143 and the magnetic field receiving arrangement comprises a first coil 141 and a second coil 142, which are all air coils. Each coil has a central axis 161, 162, and 163, respectively, wherein the first central axis 161 and the third central axis 163 coincide and the second central axis is parallel to the first and the third central axis.

Such an arrangement may enable a differential measurement of signals, i.e. the transmitted magnetic field of the magnetic field transmitting arrangement may be received and detected by both of the first coil 141 and the second coil 142 of the magnetic field receiving arrangement 120. Thus, a more precise distance measurement may be provided.

Figure 2:
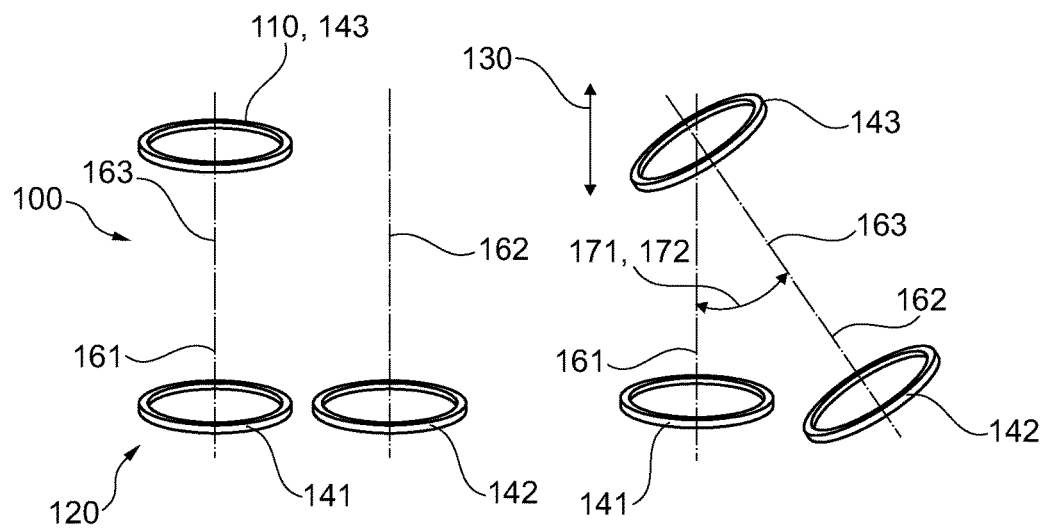
FIG. 2 illustrates an air spring height measurement arrangement according to an exemplary embodiment of the invention.

FIG. 2 illustrates an air spring height measurement arrangement 100 wherein the second central axis 162 and the third central axis 163 are inclined with respect to the first central axis 161. In this particular embodiment, the second central axis 162 and the third central axis 163 coincide such that both of the axes 162 and 163 enclose a first angle 171 and a second angle 172, respectively with the first central axis.

In other words, the third coil 143 is inclined towards the second coil 142 and the second coil 142 is inclined towards the third coil 143, wherein the measuring distance 130 and the moving direction of the third coil 143 is along the first central axis 161 towards and away from the first coil 141.

The effect about the differential signal can be altered and changed by slightly tilting the transmitter coil 143 towards the receiver coil 142. The absolute received signal strengths may be increased when the transmitter and receiver coils are facing each other (placed parallel to each other and/or having coinciding central axes).

In some applications it may not be possible to use the "tilted" coil placement (for space or cost reasons, for example). In such a case, the sensor is still fully functional but the achievable sensor performance may be somewhat limited compromised. "Tilting" the coils will increase the sensor measurement range and allows to achieve a more linear sensor output signal before the potentially used electronic digital signal processing stage.

In this embodiment, the signal received at the coil 141 may be larger than from the coil 142 in FIG. 1E. When tilting the transmitter coil 143 and the receiving coil 142 towards each other as shown in FIG. 2, the signal received in coil 142 may increase and the signal received in coil 141 may decrease.

The first angle 171 and the second angle 172 may vary between different design forms of the air spring height measurement arrangement. The first angle may be different from or identical with the second angle.

FIG. 3 illustrates an embodiments of the air spring height measurement arrangement 100, wherein the second central axis 162 and the third central axis 163 are arranged parallel to each other and do not coincide. The second central axis 162 encloses a first angle 171 with the first central axis 161 and the third central axis 163 encloses a second angle 172 with the first central axis 161. Furthermore, the first coil 141 and the second coil 142 are arranged such that they are spaced apart laterally comprising a lateral offset 145 in between them.

The measurement signal obtained by each of the receiver air coils 141, 142 may be processed individually (absolute measurements of the signals obtained from first coil 141 and second coil 142) which is called here triangulation mode, or a differential mode signal processing approach can be used. In the differential mode sensor design only the difference in the received signal of the first coil 141 and the second coil 142 is of importance. The receiver circuits and the immediate following signal processing electronics may look very different when comparing the triangulation mode with the differential mode sensor design. However, in both cases the physical placement and the design of the air coils may be similar or identical.

In FIG. 3, one signal transmitting coil 143 and two signal receiving coils 141, 142 are used. In order to achieve the maximal working stroke of an air spring, the two receiving coils are placed within the same "plane" (meaning that the receiver coils are not placed on top of each other with some spacing between them, i.e. without an overlapping section).

By placing the two receiver coils 141, 142 side by side, and by aligning the centre of the transmitter coil 143 with one of the receiver coils (in this example with the first coil 141), the differential receiver coils signal strength and the linearity of the resulting sensor output signal may be a function of a number of parameters: distance between the transmitter and the receiver coils (limits about the maximum distance between the transmitter and receiver coils may apply), inclination angles of one or more coils in relation to each other, spacing (measured from the geometric centre of one receiver coil 141 to the geometric centre of the other receiver coil 142) between the two receiver coils, chosen path of movement between the receiver coils and transmitter coil (on a straight line to each other, or in an arc-shaped curve which will be described later on), design symmetry of the receiver coils 141, 142 (symmetry means that the coils are identical).

FIG. 4 illustrates an air spring height measurement arrangement wherein the first coil 141 and the second coil 142 overlap partially in an overlap section 146.

FIG. 5 illustrates an air spring height measurement arrangement wherein the first coil 141 completely overlaps the second coil 142, i.e. the second coil 142 has a cross section area smaller than the cross section area of the first coil 141.

FIGS. 6, 7, and 8 illustrate the motion of the third coil 143 towards the magnetic field receiving arrangement 120 with the first coil 141 and the second coil 142 along the first central axis 161, wherein the inclination angle of the third coil 143 with respect to the first central axis 161 remains constant, i.e. the third central axis 163 remains parallel to the second central axis 162 during the movement of the third coil 143 along the first central axis 161.

The transmitter coil 143 is moving towards the receiver coil 141 on a direct path: first central axis 161. FIG. 6 shows the air spring height measurement arrangement in the first state, wherein the third central axis 163 coincides with the second central axis 162. The greater the distance is between the transmitter coil and the receiver coils (till a pre-determined maximum distance has been reached), the better the symmetrical alignment will be between coil 143 and coil 142. The shorter the distance is between coil 143 and coil 141 the better the signal transfer between the two coils 143 and 141. At the same time (when coil 143 is moving towards coil 141) the transmitting coil 143 is leaving the second central axis 162 (which leads to the geometric center of coil 142).

While the signals received by the two coils 141 and 142 will initially increase (as coil 143 is moving towards coil 141), the curves that describe the "Distance/Signal Gain" will be different for coil 141 and coil 142. These differences in the two "signal gain versus distance" curves is the actual sensor output signal. By changing the first angle and the second angle, the differential signal curve (sensor output signal=signal coil 141—signal coil 142, for example) can be influenced and changed.

To have better control about the optimal measurement distance (between the transmitter and receiver coils) the receiver coils can be placed side-by-side having a lateral offset (as shown in FIG. 3), or can overlap each other (as shown in FIGS. 4, 6 to 8) or can be placed inside each other (as shown in FIG. 5).

To avoid unwanted effects which may arise due to overlapped receiver coil wires, one of the receiver coils can be stretched, towards an oval shape. The diameter of one receiver coil may be much smaller and may be placed off-centre in relation to the other receiver coil. Placing the coils "inside each other" may have an advantage when manufacturing the coils, in particular when using a PCB (printed circuit board) coil design.

Another benefit may be that the receiver coil 141 can have a very large diameter which may result in larger signal amplitude. In this case, additional measures may be necessary to avoid that the two receiving coils begin to influence each other.

FIGS. 9 and 10 illustrate that the third coil 143 on the one hand as well as the first coil 141 and the second coil 142 on the other hand may be adapted to form either the magnetic field transmitting arrangement or the magnetic field receiving arrangement. Further, any one of the third coil 143 or the first coil 141 and the second coil 142 may be adapted to move towards the other one.

In other words, each of the magnetic field transmitting arrangement and the magnetic field receiving arrangement may comprise one or more coils, wherein each of the coils may be inclined with respect to the other coils or a given moving direction of either the magnetic field transmitting arrangement or the magnetic field receiving arrangement.

FIGS. 11A and 11B illustrate an air spring height measurement arrangement 100 similar to the air spring height measurement arrangement illustrated in FIGS. 1A and 1E, respectively, wherein for general remarks reference is made to these Figs.

In contrary to FIGS. 1A and 1E, FIGS. 11A and 11B show the usage of small dimension flux gate sensors as first coil 141 and second coil 142, each having a core 151, 152.

FIG. 11B shows the third coil 143 in a first state (see position 143A) and in a second state (see position 143B).

FIG. 12 shows an air spring height measurement arrangement 100 similar to the air spring height measurement arrangement shown in FIG. 3, wherein the first coil 141 and second coil 142, each having a core 151, 152, are designed as small dimension flux gate sensors.

The receiving coils 141, 142 may be replaced by very small dimension flux gate circuits, for example. One obvious benefit may be the reduced space requirements. Another benefit may be the very high magnetic field sensitivity such a design solution offers and with this the opportunity to extend the practical measurement range, i.e. the measuring distance 130. A flux gate circuit may require its own electronics.

The air spring height measurement arrangement may be built using only one flux gate coil (as shown in FIG. 11A), or using more than one Magnetic Field Sensing (MFS) inductor (see FIGS. 11B, 12). When using more than one MFS inductor, it is possible to use a differential mode signal processing mode as described above.

In general, all the coils as described above and hereinafter may be air coils, cored coils or small dimension flux gate circuits.

In general, the magnetic field transmitting arrangement generates and transmits a magnetic field which is received by the magnetic field receiving arrangement. By the strength of the magnetic field received by the magnetic field receiving arrangement, the distance between the magnetic field transmitting arrangement and the magnetic field receiving arrangement is determinable.

In an alternative embodiment, the magnetic field receiving arrangement may be adapted to receive the first magnetic field and generate a second magnetic field whose intensity corresponds to the energy received by the first magnetic field. The second magnetic field may then be received by a receiver unit of the magnetic field transmitting arrangement and then be used in order to determine the distance between the magnetic field transmitting arrangement and the magnetic field receiving arrangement.

Figure 13:
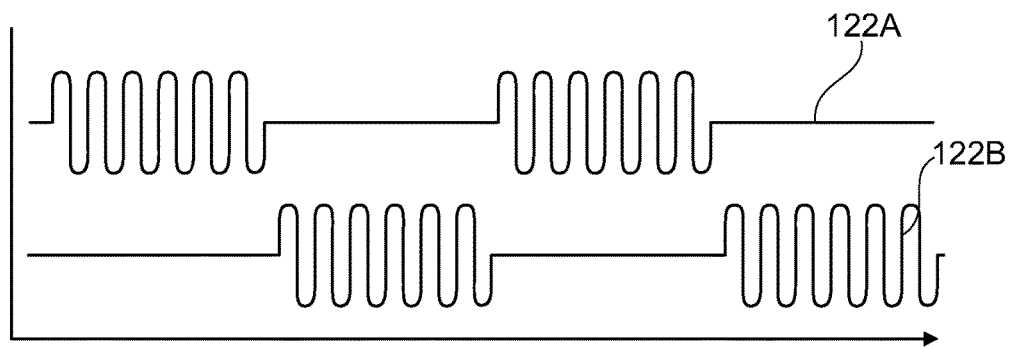
FIG. 13 illustrates a signal pattern of an air spring height measurement arrangement according to an exemplary embodiment of the invention.

FIG. 13 illustrates the received signals 122A, 122B used for determining the distance between the magnetic field transmitting arrangement and the magnetic field receiving arrangement using the differential mode. The signals 122A and 122B may be generated and transmitted by two transmitting coils, as shown in FIG. 10.

The two transmitting coils could be driven by one and the same signal generator circuit. When deciding to do so then it is important to alternate the transmitting signal sequence between the two transmitting coils. Meaning that only one transmitter coil will be powered by the signal generator (either the first or the second, but not both together). The alternating signal transmitting sequence may have the benefit of reducing unwanted parasitic effects, like signal interferences between the two transmitter coils.

The receiver signal decoding may be easier and of higher quality when using alternating transmitter signal. Meaning that only one transmitter coil will be active at any given time. One benefit may be that one and the same transmitter frequency will be used which simplifies the receiver filter circuitry substantially (which may result in smaller circuit board, lower costs).

Alternatively, two different frequencies can be used to drive the two transmitting coils. This way both transmitting coils can be active simultaneously. By doing so, the sensor signal bandwidth (SBW) will be doubled (the air spring height measurement arrangement may become faster), but the required receiver electronics now has to differentiate reliably between the two transmitter frequencies. This may result in a more complex receiver electronics design.

Figure 14:
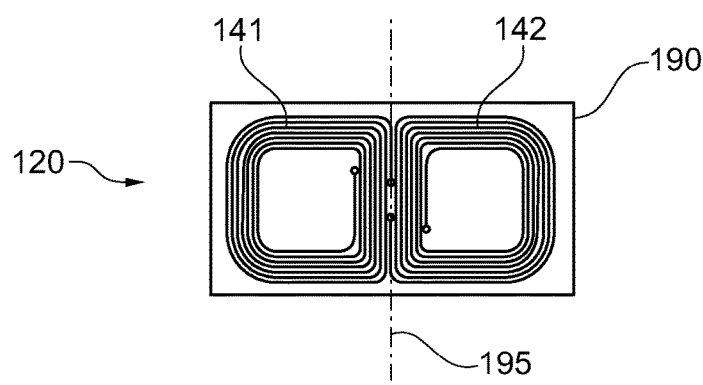
FIG. 14 illustrates a magnetic field receiving arrangement for an air spring height measurement arrangement according to an exemplary embodiment of the invention.

FIG. 14 illustrates magnetic field receiving arrangement 120 in form of a printed circuit board 190 having a first coil 141 and a second coil 142, each in form of printed paths on the printed circuit board.

The printed circuit board 190 comprises a flexible part in form of a bending line 195 which enables the setting or adjustment of an inclination angle of one of the first coil and the second coil with respect to the other one of the coils 141, 142.

In other words, instead of using single-wire wounded coils, it is also possible to use PCB-printed coils. Using PCB-printed coils may have a cost advantage when the physical coil dimensions are relative small. In addition, PCB-Printed coils may be protected much better from unwanted effects when using them under harsh operating conditions. From a certain larger size onwards, the effects when using PCB-printed coils may outweigh the other features (higher costs, larger impedance, and unused PCB space).

A PCB coil may be realized with a single layer design (only using the copper material on one side of the PCB) or with a multilayer PCB (using copper layers on both sides and even using layers that are sandwiched between the two outer layers of a PCB. To a certain extent it may be possible to place some electronics components "inside" the center of the PCB design coil (center means: the otherwise empty space in the middle of the PCB coil). However, the higher the amount of conductive material that will be placed in the center of the coil, the stronger unwanted interferences may become. This may be even more so when the components consist of ferromagnetic material.

Figure 15A:
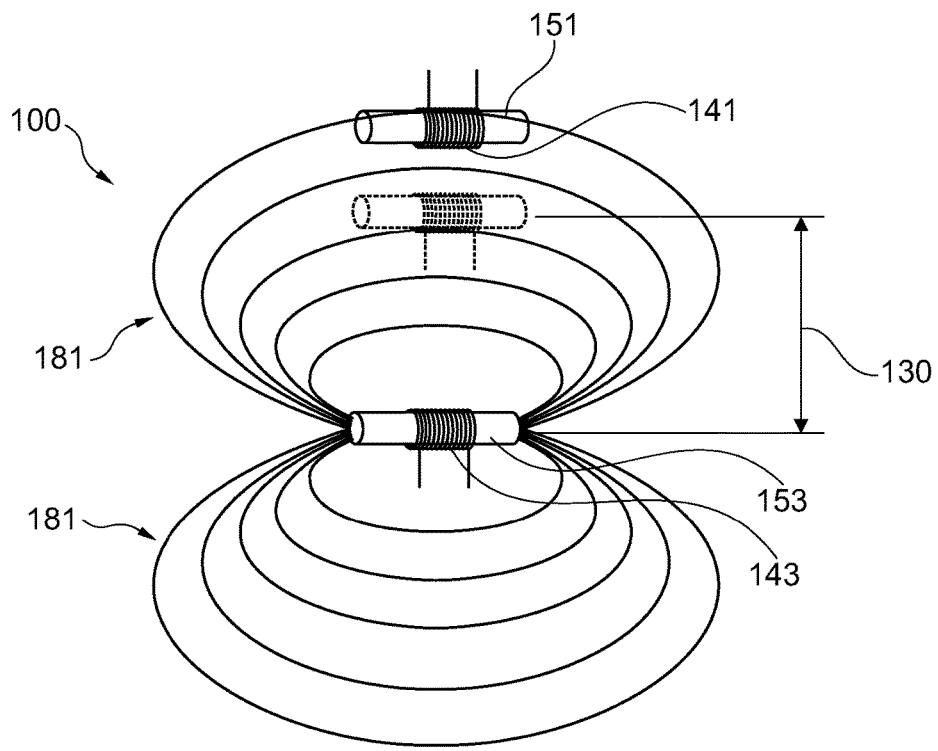
FIG. 15A illustrates a distance measurement arrangement.

FIG. 15A illustrates an air spring height measurement arrangement 100 comprising a first coil 141 and a second coil which are arranged opposite to each other in relation to a measuring direction 130 which corresponds to the moving direction of the third coil 143. The third coil 143 is illustrated in the first state (the more distant position with respect to the first coil) and in the second state (the closer position with respect to the first coil). The movement of the third coil towards and away from the first coil corresponds to the distance changes to be measured. The distance between the third coil 143 and the first coil 141 is determined based on the field strength of the first magnetic field 181 detected by the first coil 141, wherein the field lines of the first magnetic field are illustrated schematically having their source and sink at the third core 153.

The first coil 141 has a first core 151 and the third coil 143 has a third core 153, wherein the central axis of the first coil and the third coil, i.e. a longitudinal extent of the first core and of the third core, respectively, run parallel to each other.

The air spring height measurement arrangement 100 illustrated in FIGS. 1A to 12 is formed such that the measuring direction 130 and the movement direction of one of the magnetic field transmitting arrangement and the magnetic field receiving arrangement is along the magnetic field lines of the generated first magnetic field, wherein in the embodiment illustrated in FIG. 15A, the measuring direction 130 and the movement direction of one of the magnetic field transmitting arrangement and the magnetic field receiving arrangement or the first coil and the third coil, respectively, is transverse or orthogonal to the magnetic field lines of the first magnetic field.

The transmitter coil 143 and the receiver coil 141 are placed in parallel to each other in order to achieve a large measurement range 130. The magnetic field lines 181 emanating from the transmitter coil 143 are reaching out in all directions. This sensor design may be more sensitive to metallic and conductive objects that are placed within the reach of the shown flux lines. The flux lines reaching out towards the receiver coil 141 will be called the working field, the interfering flux lines or the field losses are called here loss field.

To reduce the sensors sensitivity towards other ferromagnetic objects and conductive objects, that may be placed close to the air spring height measurement arrangement, either the loss field may have to be blocked, e.g. through passive magnetic shielding, or an active compensation approach, which will be described further below, may have to be applied. Without any of these two compensation design options, this specific sensor design may have a limited use and may be suitable for specific applications only.

Figure 16:
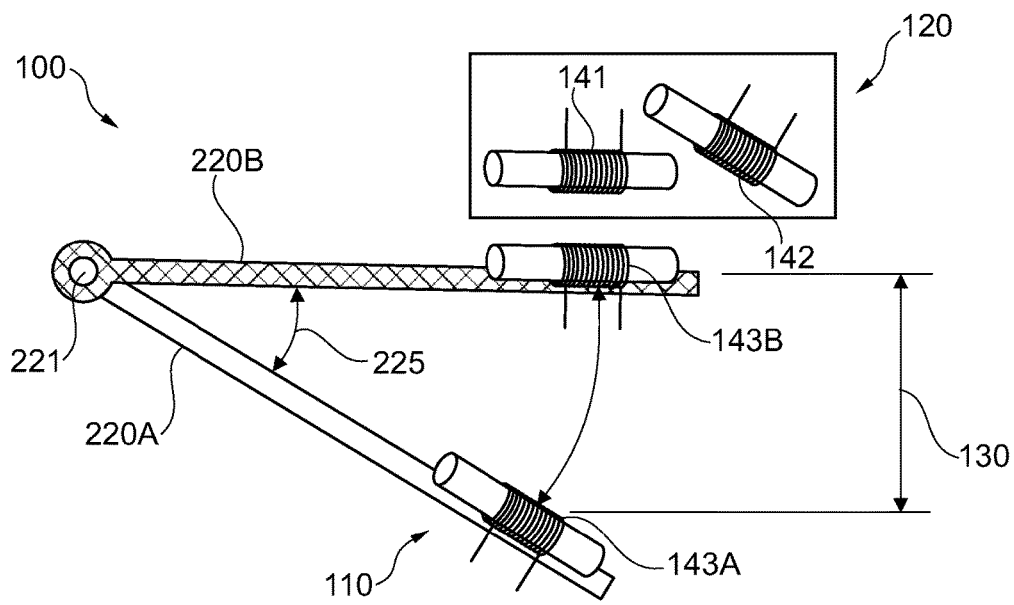
FIG. 16 illustrates an air spring height measurement arrangement according to an exemplary embodiment of the invention.

FIG. 16 illustrates an air spring height measurement arrangement 100 with a magnetic field transmitting arrangement 110 having a third coil 143 and a magnetic field receiving arrangement 120 having a first coil 141 and a second coil 142, wherein each of the coils is a cored coil.

The third coil 143 is attached to a movable part 220, which is rotatably movable in the moving direction 225 around the hinge 221. The third coil 143 and the movable part 220 are shown in the first state indicated by the suffixes "A" to the respective reference signs and in the second state indicated by the suffixes "B" to the respective reference signs.

In the first state, the third coil 143A is located opposite to the second coil 142 and the respective central axes 163, 162 (not shown) are parallel to each other. In the second state, the third coil 143B is located opposite to the first coil 141 and the respective central axes 163, 161 are parallel to each other.

Thus, the measurement accuracy may be high in a position of the movable part close to the first state as the third coil and the second coil are arranged opposite to each other and in a position of the movable part close to the second state as the third coil and the first coil are arranged opposite to each other such that the sensitivity of the coils 141, 142 of the magnetic field receiving arrangement 120 may be maximum even though the movable part is subjected to a rotary movement.

The relation of the respective central axes of the coils in the air spring height measurement arrangement illustrated in FIG. 16 will become more apparent from the illustration shown in FIG. 16A below.

In applications where a wheel suspension system is "swinging" in-and-out, i.e. is performing a rotary movement or following an arc-shaped curve, a tilted receiver coil 142 may be most sensitive when the transmitter coil 143 is in a parallel aligned position 143A. When analyzing the signal from both receiver coils 141 and 142, then a computation device like a microprocessor based system can calculate the exact distance and angular movement of the third coil 143 and the movable part 220.

Figure 16A:
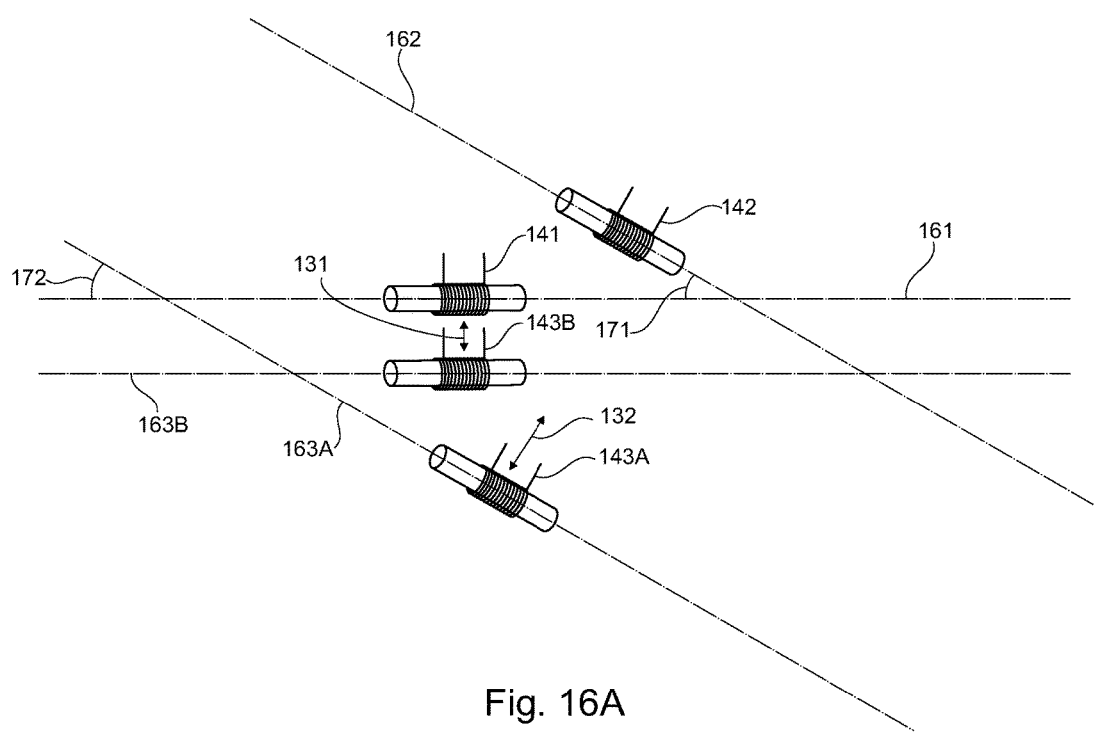
FIG. 16A schematically illustrates an air spring height measurement arrangement according to an exemplary embodiment of the invention.

FIG. 16A illustrates the central axes and the angles in between the central axes of the coils in the air spring height measurement arrangement 100 shown in FIG. 16.

In the first state, the third central axis 163A of the third coil 143A runs parallel to the second central axis 162 of the second coil 142. Further, in the first state, the third central axis 163A and the first central axis 161 intersect under the second angle 172 and the second measuring direction 132 extends perpendicular to the third central axis 163A and to the second central axis 162 between the axes 163A and 162.

In the second state, the third central axis 163B runs parallel to the first central axis 161 and intersects with the second central axis 162 under the first angle 171. Furthermore, the first central axis 161 and the second central axis are aligned with respect to each other such that they enclose the first angle 171 and the first measuring direction 131 extends perpendicular to the third central axis 163B and to the first central axis 161 between the axes 163B and 161.

It should be noted that, in the first state, the third central axis 163A and the second central axis 162 may also intersect, i.e. not run parallel to each other. Similarly, in the second state, the third central axis 163B and the first central axis 161 may intersect.

Figure 17A:
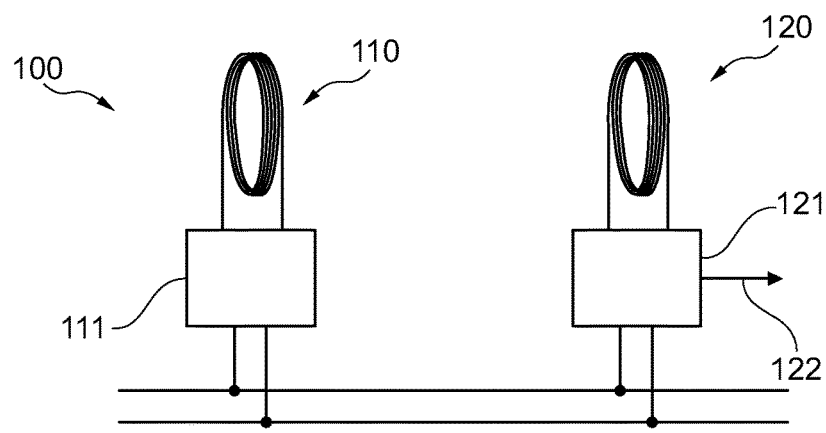
FIG. 17A illustrates an air spring height measurement arrangement according to an exemplary embodiment of the invention.
Figure 17B:
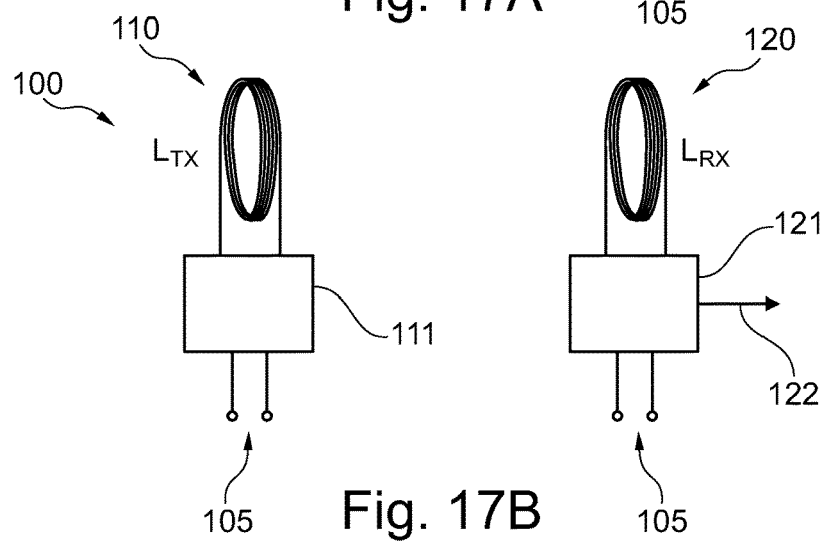
FIG. 17B illustrates an air spring height measurement arrangement according to an exemplary embodiment of the invention.
Figure 17C:
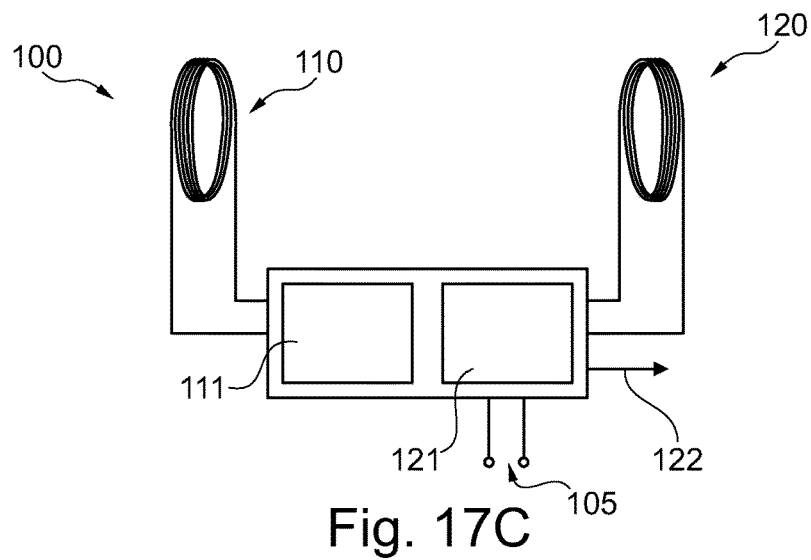
FIG. 17C illustrates an air spring height measurement arrangement according to an exemplary embodiment of the invention.

FIGS. 17A, 17B, and 17C illustrate different options of signal conditioning or signal processing and power supply of the air spring height measurement arrangement 100 according to the invention.

The transmitter side and the receiver side of the air spring height measurement arrangement require electronics. The required electronics can be placed on one common PCB (transmitter and receiver electronics are placed together) or can be on separate PCBs. This will result in different wiring options.

FIG. 17A illustrates a common power supply 105 and separate signal condition and processing units 111, 121 for the magnetic field transmitting arrangement 110 and the magnetic field receiving arrangement 120, respectively.

Each air spring height measurement arrangement function (transmitter and receiver) have their own, independent from each other running electronic circuit. The electronic modules share the same power supply.

FIG. 17B illustrates separate power supply and separate signal condition and processing units for the magnetic field transmitting arrangement and the magnetic field receiving arrangement, respectively.

Each of the two different air spring height measurement arrangement functions (transmitter and receiver) has its own, independent from each other, electrical power supply. Thus, there may be no need for a direct wire connection between the two functions.

In this example (two different power supplies), it may be possible that the electric supply for the transmitter is self generated by one (or a combination) of the following means: battery (rechargeable or non-rechargeable), vibration powered electric current generator (road surface dependent), acoustic sound powered generator (which is another form of vibration), electromagnetic energy transfer.

FIG. 17C illustrates a common power supply and a common signal processing unit comprising a transmitter circuit 111 and a receiver circuit 121 for the magnetic field transmitting arrangement and the magnetic field receiving arrangement.

In this example, the two air spring height measurement arrangement functions (transmitter and receiver) are placed onto one and the same PCB (Printed Circuit Board). In this case the entire electronics is running from the same power supply lines.

Figures 18A, 18B:
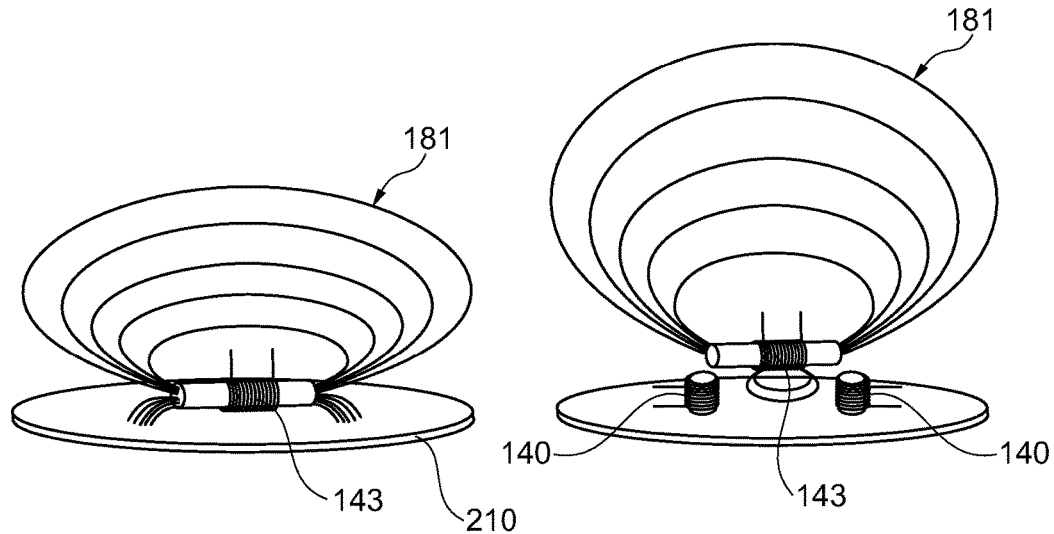
FIG. 18A illustrates a bottom plate of an air spring.
FIG. 18B illustrates a bottom plate of an air spring according to an exemplary embodiment of the invention.

FIG. 18A illustrates a mounting plate 210 with the third coil 143 attached to the mounting plate. The third coil generates the first magnetic field 181 for determining a distance to the magnetic field receiving arrangement, which is not shown in this arrangement.

FIG. 18B illustrates a mounting plate 210 with the third coil 143 and two compensation coils 140 arranged at the front side and the back side of the core of the third coil in order to adjust the direction and the strength of the magnetic field lines of the first magnetic field 181 such that a measuring direction or a working stroke may be larger. The polarity of the compensation coils 140 may be adapted to redirect the magnetic field lines of the first magnetic field 181 such that less magnetic flux enters the mounting plate 210 or is distracted by the mounting plate 210.

When a mounting plate of the air spring height measurement arrangement for mounting it on or in an air spring is tooled from or comprises ferromagnetic material (like magnetic steel) then the magnetic field generated and emitted by the transmitter coil may be absorbed to a certain extent. The closer the transmitter coil is placed to the mounting plate, the more of the magnetic field will be absorbed that is generated by the transmitter coil 143. Consequently, the transmitting range may be negatively interfered and may result in a shorter measurement distance.

In a similar way the electromagnetic signal that has to be received by the receiving coils 141, 142 may be affected when they are placed near to a ferromagnetic mounting plate.

In other words, an active magnetic field deflecting design is used. Instead of allowing the magnetic flux to be absorbed by the mounting plate, for example a steel plate, additional coils, placed near to the end of the transmitter inductor will emit a magnetic field with the polarity identical to the field coming out at the end of the core device.

Identical magnetic polarities repel each other and with this actively reduce the number of magnetic flux lines that otherwise would choose to travel through the steel plate. Final consequence, the transmitting range may be extended. On the other side, the complexity of the transmitter circuit may be increased and so the electric current consumption.

In an alternative embodiment, the core of the third coil may be a bent or a buckled core such that the surface areas of the core are directed towards the intended direction of the magnetic field.

Figure 19:
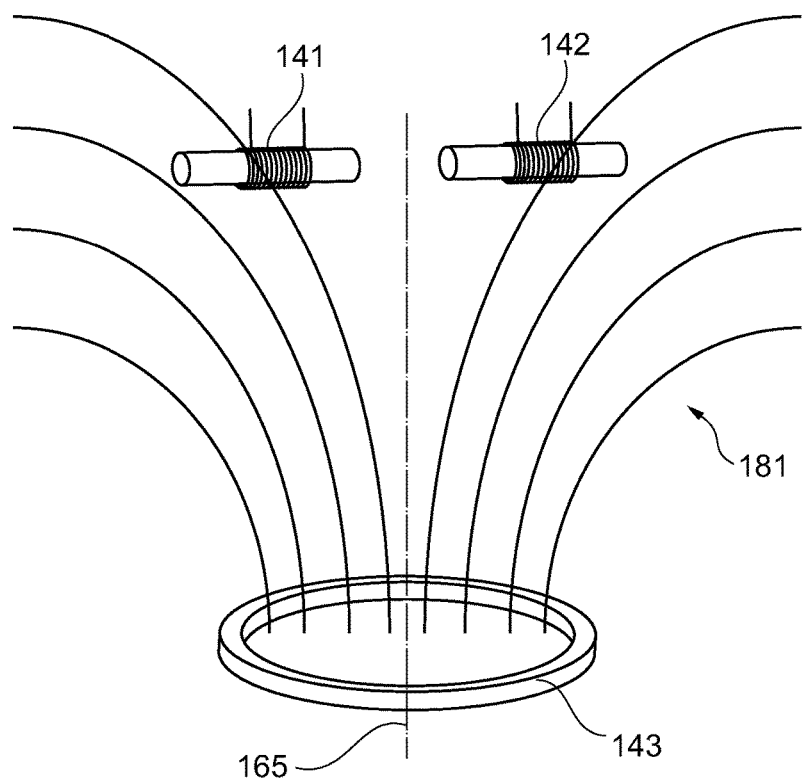
FIG. 19 illustrates an air spring height measurement arrangement according to an exemplary embodiment of the invention.

FIG. 19 illustrates an air spring height measurement arrangement with an air coil as the third coil 143 and two cored coils as the first coil 141 and the second coil 142, wherein the first and second coil are arranged symmetrical to a symmetry line 165, which may be the central axis of the third coil 143 in one exemplary embodiment.

The central axes of the first and the second coil may be arranged perpendicular to the symmetry line 165 or the central axis of the third coil.

When placing cored receiving coils 141, 142 perpendicular to the central axis of the transmitting coil, the receiving coil (or the receiving coils) may be placed "off-center" in relation to the transmitter air coil. In case one perpendicularly placed cored receiver coil would be placed right above the air coil center line or central axis of the third coil, there may be no signal to measure as the magnetic field lines 181 may cancel out each other inside the elongated receiver coil core.

FIG. 19 shows two receiver coils 141, 142 placed with a lateral offset or off center in relation to the central axis of the transmitter air coil 143. By building the differential signal of the two receiving coils this specific height/distance sensor design may achieve a very wide sensing range. This design may be very sensitive to assembly tolerances and shifts of the transmitter center line (which may happen when the vehicle movements cause a temporarily misalignment between the bottom and the top of the air spring, in case the air spring height measurement arrangement is mounted in or on an air spring.

This design may assure a large working stroke or a large measuring distance as the receiver coils and the transmitter coils do not take away much "vertically" oriented space inside the air spring, i.e. the longitudinal expansion of the cores of the first and second coils is perpendicular to the measuring distance from the third coil 143 to the first and second coil 141, 142.

This design may allow a differential signal (signal of the first coil 141—signal of the second coil 142) and a very good compensation for unwanted EMI effects without the use of complex electronic circuits.

Figure 20A:
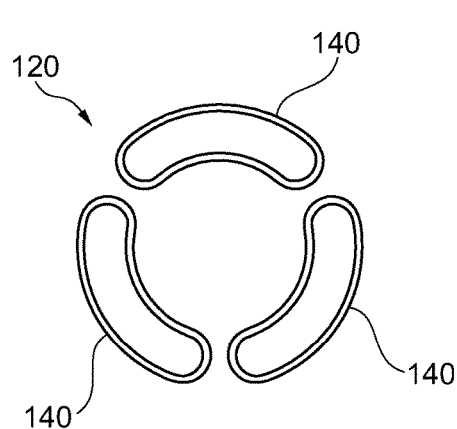
FIG. 20A illustrates a magnetic field receiving arrangement for an air spring height measurement arrangement according to an exemplary embodiment of the invention.

FIG. 20A illustrates a magnetic field receiving arrangement 120 comprising three coils 140 which are arranged circular.

It should be noted that the magnetic field receiving arrangement as well as the magnetic field transmitting arrangement as described above and hereinafter each may comprise one, two or more coils, wherein each of the coils may be inclined with respect to the intended measuring direction or movement direction of the magnetic field transmitting arrangement or the magnetic field receiving arrangement.

Figure 20B:
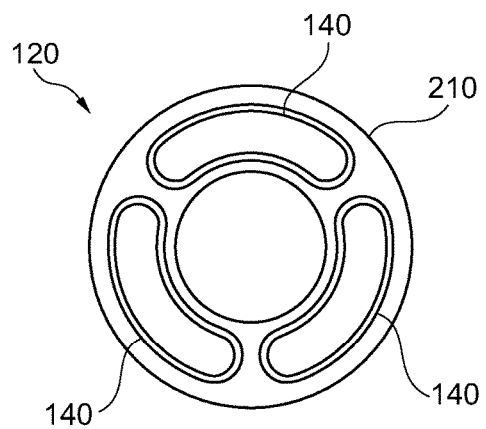
FIG. 20B illustrates a magnetic field receiving arrangement for an air spring height measurement arrangement according to an exemplary embodiment of the invention.

FIG. 20B illustrates a mounting plate 210 having the magnetic field receiving arrangement 120 illustrated in FIG. 20A, wherein the mounting plate has a circular recess in its center.

Three oval shaped or kidney shaped receiver coils or transmitter coils may allow triangulating the distance and the position of the transmitter coil or the receiver coil, respectively. With this, the exact position of the Air-Springs top-and-bottom plates (in relation to each other) may be determined and quantified in a three dimensional space (distance, left and right position: Z, X, and Y). When using a PCB coil design then it may be even more easily to realize such multi coil design.

Of course, when using a four coil design, the determination (and with this the computer algorithms required for calculation) may be much simpler to define the position of the transmitting (or receiving) coil.

Figure 21A:
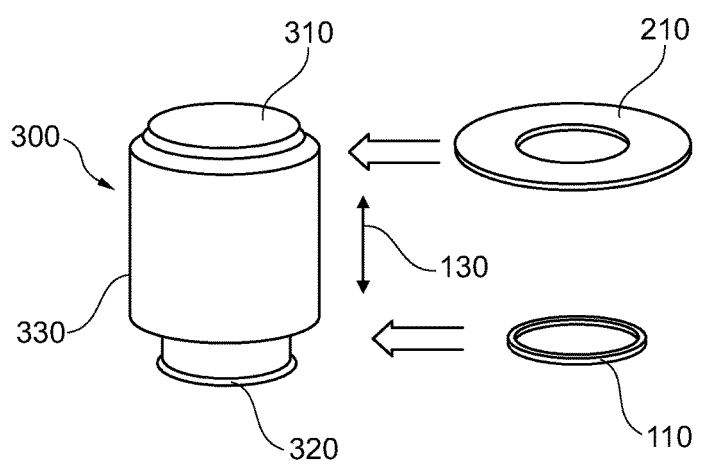
FIG. 21A illustrates an air spring with an air spring height measurement arrangement according to an exemplary embodiment of the invention.

FIG. 21A illustrates an air spring 300 with a first mounting element 310, a second mounting element 320, and a bellow 330 extending from the first mounting element to the second mounting element and enclosing an air volume inside the air spring. The air spring 300 is adapted to change is extension along the direction 130 and thus provide the required spring effect. Within the air spring, a magnetic field transmitting arrangement 110 and a mounting plate 210 with a magnetic field receiving arrangement (not shown) are installed in order to measure the distance between the magnetic field receiving arrangement and the magnetic field transmitting arrangement and thus the expansion or extension of the air spring.

Figure 21B:
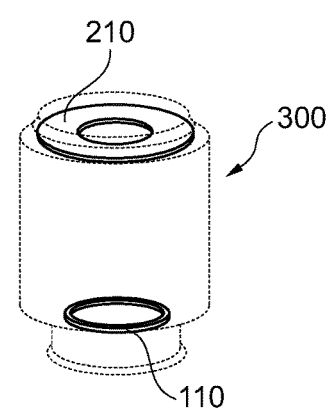
FIG. 21B illustrates an air spring with an air spring height measurement arrangement according to an exemplary embodiment of the invention.

FIG. 21B illustrates the air spring of FIG. 21A in a mounted state, i.e. with the magnetic field transmitting arrangement 110 and the mounting plate 210 with the magnetic field receiving arrangement within the air spring and in particular within the air volume of the air spring.

Figure 22:
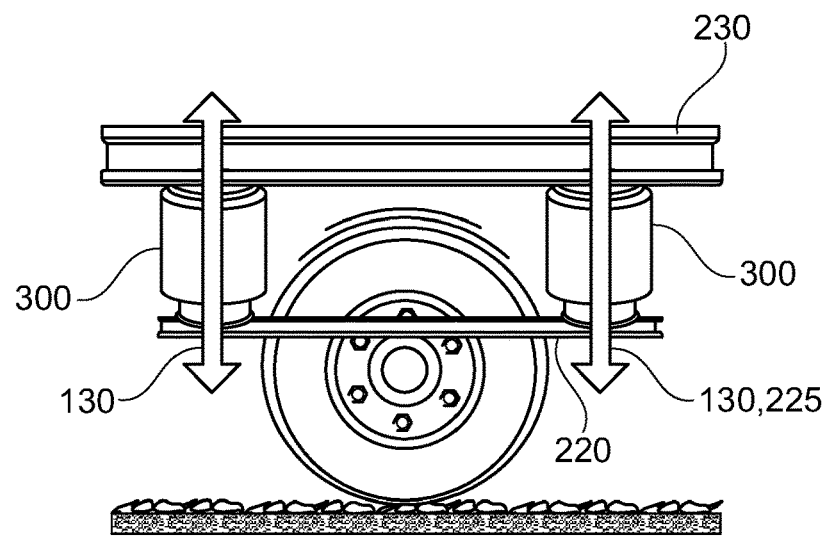
FIG. 22 illustrates a wheel suspension with an air spring according to an exemplary embodiment of the invention.

FIG. 22 illustrates a wheel suspension of a vehicle with two air springs 300 as described above and hereinafter. The movable part 220, which is mounted to the wheel, is adapted to move along the arrows 130, which correspond to the measuring distance 130 and moving direction 225 of the air springs, wherein one mounting element of the air spring is attached to the movable part 220. The other one mounting part of the air spring is mounted to the vehicle's chassis 230.

The air spring 300 as shown in FIG. 22 may in particular comprise an air spring height measurement arrangement as illustrated in one of the FIGS. 1A to 12, as the moving direction of the air spring is in general a linear moving.

Figure 23:
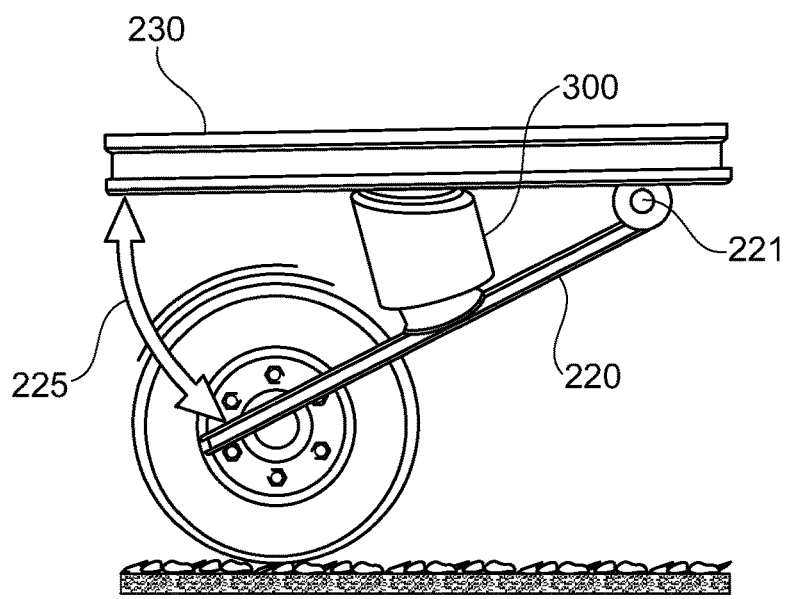
FIG. 23 illustrates a wheel suspension with an air spring according to an exemplary embodiment of the invention.

FIG. 23 illustrates an alternative wheel suspension of a vehicle with one air spring 300, wherein one mounting element of the air spring is attached to the movable part 220 and the other one mounting element is attached to the vehicle's chassis 230 and wherein the movable part is rotatably movable around the hinge 221.

The air spring 300 as shown in FIG. 23 may in particular comprise an air spring height measurement arrangement as illustrated for example in FIGS. 16 and 16A as the movable part and thus the mounting element attached to the movable part performs a rotary movement or an arc shaped movement.

In other words, depending on the mechanical design of the vehicles suspension system, the axle of the vehicle is either moving up and down (as shown in FIG. 22) on a straight path, or the axle might follow an arc shaped path (as shown in FIG. 23). In the first incident the top and bottom plates of the air spring remain parallel to each other at all times, while in the second incident they do not remain parallel. This may have an implication on the air spring height measurement arrangement design as well.

In most cases the vehicles axles are mounted in such way that when the wheel is moving up and down (because of the road and driving conditions), the wheel will execute this movement following one single axis like "straight up" or "straight down". When related just to height measurement, the potential side movement may be ignored for purposes of better understanding. In such a case the used air spring(s) are also contracting and expanding following a straight line.

Particular in some trailer designs, the axle fixture is such that the wheel is moving up and down following an arc shaped curve, meaning that the contraction and expansion of the air spring is now following a two axial path. This means that the top and bottom plates of the air spring are not in a parallel position when the air spring is expanding.

In applications where the air spring plates are not staying in a parallel position to each other, at least two receiver coils may be needed to compensate for the effects of the non-linear sensor system movement. However, when using three or more than three receiver coils then "any" type of movement of the suspension system may be detected and measured including "side" movements. In most cases an air spring has a mechanical buffer, or mechanical "stop" function built in the center of the top and bottom plates. This may prevent that the air spring may be damaged in a fully deflated (fully contracted) position. Therefore, the center area of any coil design (this applies to magnetic field transmitting arrangement and magnetic field receiving arrangement, i.e. to transmitter coils and to receiver coils, respectively) may have to be kept free.

This application claims benefit of European Patent Application Serial No. EP 12191149, filed on Nov. 2, 2012. While certain representative embodiments and details have been shown for the purpose of illustrating the subject invention, it will be apparent to those skilled in this art that various changes and modifications can be made therein without departing from the scope of the subject invention.

What is claimed is:

1. An air spring height measurement arrangement, comprising:
   a magnetic field transmitting arrangement; and
   a magnetic field receiving arrangement;
      wherein the magnetic field transmitting arrangement is adapted to adopt a first state and a second state with regard to the magnetic field receiving arrangement;
      wherein one of the magnetic field transmitting arrangement and the magnetic field receiving arrangement comprises a first coil and a second coil;
      wherein the other one of the magnetic field transmitting arrangement and the magnetic field receiving arrangement comprises a third coil;
      wherein a first central axis of the first coil and a second central axis of the second coil enclose a first angle which is unequal to 0°;

wherein, in the first state, a third central axis of the third coil and the first central axis enclose a second angle which is unequal to 0°, and wherein the third coil transitions from the first state to the second state along the first central axis of the first coil.

2. The air spring height measurement arrangement according to claim 1, wherein the magnetic field transmitting arrangement comprises a magnetic field receiving unit and the magnetic field receiving arrangement comprises a magnetic field transmitting unit;

wherein the magnetic field transmitting arrangement is adapted to transmit a first magnetic field;

wherein the magnetic field receiving arrangement is adapted to receive the first magnetic field;

wherein the transmitting unit is adapted to transmit a second magnetic field which is generated out of an energy corresponding to the received first magnetic field; and wherein the receiving unit is adapted to receive the second magnetic field.

3. The air spring height measurement arrangement according to claim 1, wherein the first angle is equal to the second angle.

4. The air spring height measurement arrangement according to claim 1, wherein at least one of the first coil, the second coil, and the third coil comprises a core element.

5. The air spring height measurement arrangement according to claim 1, wherein, in the first state, the third central axis and the second central axis run parallel to each other.

6. The air spring height measurement arrangement according to claim 1, wherein, in the first state, the third central axis and the second central axis coincide.

7. The air spring height measurement arrangement according to claim 1, wherein the first coil comprises a lateral offset in a direction perpendicular to the first central axis with regard to the second coil.

8. The air spring height measurement arrangement according to claim 1, wherein the first coil overlaps the second coil in an overlap section at least partially in a direction perpendicular to the first central axis.

9. The air spring height measurement arrangement according to claim 8, wherein the first coil completely overlaps the second coil in a direction perpendicular to the first central axis.

10. The air spring height measurement arrangement of claim 1, wherein the third coil is inclined towards the second coil so that the third coil faces the second coil.

11. The air spring height measurement arrangement according to claim 1, wherein each of the first coil and the second coil is a printed coil on a printed circuit board.

12. The air spring height measurement arrangement according to claim 1, wherein in the second state, the third central axis and the first central axis run parallel to each other.

13. The air spring height measurement arrangement according to claim 1, wherein, in the first state, the third coil and the second coil are arranged opposite to each other in a direction of a second measuring direction.

14. The air spring height measurement arrangement according to claim 13, wherein, in the second state, the third coil and the first coil are arranged opposite to each other in a direction of a first measuring direction.

15. The air spring height measurement arrangement according to claim 14, wherein a movement of the magnetic field transmitting arrangement from the first state to the second state is adapted to occur within a measuring plane which is defined by the first measuring direction and the second measuring direction.

16. The air spring height measurement arrangement of claim 1, further comprising:

a first mounting element for being fixed to one of a vehicle's chassis and a movable part of a vehicle being movable with respect to the chassis;

a second mounting element for being fixed to the other one of the vehicle's chassis and the movable part of the vehicle being movable with respect to the chassis;

a bellow extending from the first mounting element to the second mounting element and including an air volume;

wherein the magnetic field transmitting arrangement is arranged at the first mounting element;

wherein the magnetic field receiving arrangement is arranged at the second mounting element; and wherein a movement of the first mounting element with respect to the second mounting element represents at least a part of a working stroke of the air spring.

17. The air spring height measurement arrangement of claim 16, wherein the magnetic field transmitting arrangement comprises a magnetic field receiving unit and the magnetic field receiving arrangement comprises a magnetic field transmitting unit; wherein the magnetic field transmitting arrangement is adapted to transmit a first magnetic field; wherein the magnetic field receiving arrangement is adapted to receive the first magnetic field; wherein the transmitting unit is adapted to transmit a second magnetic field which is generated out of an energy corresponding to the received first magnetic field; and wherein the receiving unit is adapted to receive the second magnetic field.

18. The air spring height measurement arrangement of claim 16, wherein the first angle is equal to the second angle.

19. The air spring height measurement arrangement of claim 16, wherein at least one of the first coil, the second coil, and the third coil comprises a core element.

20. The air spring height measurement arrangement of claim 16, wherein, in the first state, the third central axis and the second central axis run parallel to each other.

* * * * *